UNITED STATES PATENT OFFICE.

EDWIN K. WELCH, OF PHILADELPHIA, PENNSYLVANIA.

MORTAR COMPOSITION.

SPECIFICATION forming part of Letters Patent No. 706,138, dated August 5, 1902.

Application filed December 20, 1901. Serial No. 86,721. (No specimens.)

*To all whom it may concern:*

Be it known that I, EDWIN K. WELCH, a citizen of the United States, residing at the city of Philadelphia, in the county of Philadelphia and State of Pennsylvania, have invented certain new and useful Improvements in Mortar Composition, of which the following is a specification.

My invention has relation to a prepared plaster material, as a mortar, for building and similar operations.

The principal object of my present invention is to provide a comparatively inexpensive and reliable prepared plaster material for employment as a mortar for building and other operations.

My invention, stated in general terms, consists of a mortar composition prepared in substantially the manner hereinafter described and claimed.

The plastering material for being used as a mortar of my invention for building and other somewhat similar operations is preferably prepared as specified hereunder and composed of the matter and substances or materials as follows: jute or the like as a binder for the matter or materials and in about the proportion of ten per cent. by weight, ground or crushed unslaked lime as the slakening agent and in about the proportion of twenty-five per cent. by weight, ground or crushed cinder from anthracite or bituminous coal burned in steam-boilers or hot-water furnaces as a filler and strengthening ingredient and in about the proportion of sixty per cent. by weight, and litharge as a drying and hardening agent and in about the proportion of five per cent. by weight. Water may be added to the mechanically-combined mixture of the said matter and materials when required for use as a mortar composition in either a dry or wet condition, according to the intended particular use to be made thereof.

In the preparation of the said mechanically-combined mortar mixture or composition the cinder by reason of its grit acts as a filler and is a substitute for sand; but it has this advantage over sand of furnishing a certain percentage of quicklime and of oxid of iron, as well as making the mixture more enduring and strengthening the same, as well as cheapening production due to the less quantity of lime required in the making of the mortar composition. The litharge added to the mass in a substantially dry state to the other ingredients of the mechanically-mixed composition not only greatly hastens drying, but also hardening of the mass or mixture in its combined condition when applied. The plastering composition when prepared as hereinbefore explained may have the water added thereto either at the place of manufacture or place of use, as preferred.

Having thus described the nature and object of my invention, what I claim as new and desire to secure by Letters Patent, is—

1. A composition of matter adapted with the addition of water to form a mortar or plastering material, the said composition consisting of ground or crushed unslaked lime, ground or crushed cinder, jute and litharge, all mechanically combined in a substantially dry state.

2. A composition of matter adapted with the addition of water to form a mortar or plastering mixture or composition, consisting of twenty-five per cent. of ground or crushed unslaked lime, sixty per cent. of ground or crushed cinder, ten per cent. of jute and five per cent. of litharge, all mechanically combined in a substantially dry state.

In witness whereof I have hereunto set my signature in the presence of two subscribing witnesses.

EDWIN K. WELCH.

Witnesses:
J. WALTER DOUGLASS,
THOMAS M. SMITH.